United States Patent [19]

Fang

[11] 4,238,303

[45] Dec. 9, 1980

[54] DIAPHRAGM MODIFIER FOR CHLOR-ALKALI CELL

[75] Inventor: James C. Fang, Media, Pa.

[73] Assignee: E. I. Du Pont de Nemours and Company, Wilmington, Del.

[21] Appl. No.: 933,561

[22] Filed: Aug. 14, 1978

[51] Int. Cl.$^3$ .............. C25B 1/46; C25B 13/08; H01M 2/16; C08K 3/22

[52] U.S. Cl. ................... 204/98; 162/155; 204/295; 204/296; 204/128; 429/251; 521/27; 521/33

[58] Field of Search .............. 204/296, 295, 98, 128; 162/155; 429/251; 260/42.27; 521/25, 27, 33

[56] References Cited

U.S. PATENT DOCUMENTS

| | | |
|---|---|---|
| 2,698,788 | 1/1955 | Greenman et al. |
| 2,962,415 | 11/1960 | Arledter ........................... 162/145 |
| 3,116,226 | 12/1963 | Bowers ..................... 204/158 HE |
| 3,144,379 | 8/1964 | Gelbert ............................. 162/155 |
| 3,238,056 | 3/1966 | Pall et al. ......................... 428/338 |
| 3,694,281 | 9/1972 | Leduc . |
| 3,853,721 | 12/1974 | Darlington et al. ............... 204/98 |
| 3,928,166 | 12/1975 | O'Leary et al. .................. 204/282 |
| 3,945,910 | 3/1976 | DeCeuster et al. ............... 204/296 |
| 3,965,284 | 6/1976 | Xanthos et al. .................. 428/404 |
| 4,007,059 | 2/1977 | Witherspoon et al. ............... 429/9 |
| 4,070,257 | 1/1978 | Motani et al. ..................... 204/98 |

FOREIGN PATENT DOCUMENTS 51-139893 12/1976 Japan .
51-145482 12/1976 Japan .
52-156788 12/1977 Japan .
1286859 8/1972 United Kingdom .

OTHER PUBLICATIONS

Van Der Heiden, Proc. of a Symposium, U. City London, Jun. 1976, Pub. by Chem. Soc., 1977.

*Primary Examiner*—F. C. Edmundson

[57] ABSTRACT

Magnesium compounds, such as magnesium oxide or hydroxide, at least partially reacted with fluoropolymer containing carboxyl ions, carboxylic acid or carbonyl fluoride functional groups provide compositions which are useful as modifiers for asbestos diaphragms for chlor-alkali cells to reduce the voltage and increase the efficiency of such cells.

45 Claims, No Drawings

DIAPHRAGM MODIFIER FOR CHLOR-ALKALI CELL

BACKGROUND OF THE INVENTION

This invention relates to fluoropolymers reacted with magnesium compounds, particularly suited for use as a modifier for asbestos diaphragms in chlor-alkali cells.

In the electrolysis of aqueous sodium chloride solutions or other brines to produce chlorine and caustic, one of the principal types of equipment used has a porous asbestos diaphragm separating the anode and cathode chambers. The anode can be provided in the form of graphite, a dimensionally stable or adjustable metal anode or as other types known in the art. The cathode is typically a woven wire mesh screen. The diaphragm can be formed directly on the side of the cathode facing the anode chamber by vacuum deposition of asbestos and binders by techniques similar to those used in paper making. The deposited diaphragm is normally heated to fuse the binder.

The diaphragm must be porous enough to permit the flow of brine from the anode chamber into the cathode chamber under a small hydrostatic head of pressure. But it should also inhibit the diffusion of hydroxyl ions from the cathode chamber back into the anode chamber. The flow of the brine from the anode chamber to the cathode chamber aids in minimizing diffusion from the cathode chamber back into the anode chamber. Also, excessive leakage of hydrogen or chlorine gases through the diaphragm could contaminate the products being produced and require costly purification or even produce hazardous mixtures of the two gases. Although the nature of asbestos is not completely understood, it has been theorized that hydroxyl ion diffusion is inhibited by negative charges and a concentration of hydroxyl ions in the hydrated magnesium silicate at the surface of the asbestos. These featurs, combined with the chemical resistance of asbestos, make it a desirable component of chlor-alkali cell diaphragms.

However, chlor-alkali cell diaphragms made only or mainly of asbestos have a short life. The cathode chamber has a highly basic pH, such as 11-14, while the anode chamber has an acid pH, such as 3-5. Combined with the flow of brine through the diaphragm, these factors cause erosion and dimensional changes in an asbestos diaphragm, requiring replacement of the diaphragm when the cell becomes too inefficient.

Asbestos diaphragms have been improved by using various binders and modifiers. Fluorocarbon resins such as polytetrafluoroethylene (PTFE) and copolymers of tetrafluoroethylene and hexafluoropropylene, known as fluorinated ethylene-propylene (FEP), are effective as binders, due in part to their chemical inertness. Such polymers can be provided as an aqueous codispersion with asbestos from which the diaphragm is deposited. See U.S. Pat. Nos. 3,928,166—O'Leary et al. (1975) and 4,070,257—Motani et al. (1978). Fibers of such resins can also be used in the dispersions. Upon heating to fuse the fluorocarbon resin, the binder adheres to the asbestos in places, generally without completely coating the asbestos. Leaving much of the surface of the asbestos exposed is desirable since asbestos is hydrophilic, that is it wets readily, aiding the brine in flowing through the diaphragm, and it is thought that its surface characteristics can inhibit the back diffusion of hydroxyl ions.

In addition to such fluorocarbon resins which are hydrophobic, fluoropolymer resins containing hydrophilic functional groups such as carboxylic, sulfonic and phosphonic groups can be used as asbestos diaphragm modifiers. They can completely coat the asbestos, substituting their own functional groups for the surface charge and hydrophilic characteristics of the asbestos which then functions as a stable filler. Such resins can react with the asbestos rather than merely sticking to it, as discussed in Dutch Pat. No. 69/17096 (1970) and British Pat. No. 1,286,859 (1972), both to Grot, and U.S. Pat. No. 3,853,721—Darlington et al. (1974).

Each of the developments of the prior art is less than ideal. The fluoropolymer resins with functional groups are generally more expensive than fluorocarbon resins without the functional groups. Diaphragms with exposed asbestos remain subject to attack. Also, magnesium compound tends to be dissolved from the asbestos fibers themselves at the acid (anode) side of the diaphragm and be deposited as magnesium hydroxide on the basic (cathode) side of the diaphragm. This causes restrictions in the size of pores through the diaphragm and sooner or later can clog the pores to the point where the diaphragm is no longer useful. Alternatively, fine particle size magnesium hydroxide can be washed all the way through the diaphragm, leaving a silicate surface. Excessive flow rates and voltages can result. See "Fundamentals of Diaphragm Performance" by van der Heiden, pp. 33-40 of "Diaphragm Cells for Chlorine Productions—Proceedings of a Symposium Held at University City, London, England, June 16 and 17, 1976," published by the London Society of Chemical Industry, 1977.

U.S. Pat. No. 4,007,059—Witherspoon et al. provides a fuel cell diaphragm comprising asbestos, PTFE, FEP and alkaline earth metal oxide. However, such a fuel cell has a strongly basic environment throughout, and there is no flow of brine through the diaphragm as in a chlor-alkali cell.

Japanese Pat. Publication No. 1,139,893—Arcles et al. (1977) discloses that irradiated FEP has enhanced adhesion, but it does not relate to chlor-alkali cell diaphragms.

SUMMARY OF THE INVENTION

The present invention provides a composition of matter comprising at least one magnesium compound selected from magnesium oxide, hydroxide, carbonate, oxyhalide, and hydroxyhalide (wherein the halide is at least one of fluorine and chlorine), at least partially reacted with a fluoropolymer containing functional groups of carboxyl ions, carboxylic acid or carbonyl fluoride or combinations thereof and optionally olefinic double bonds, said fluoropolymer having an equivalent weight for each such functional group of not more than about 50,000, preferably not more than about 25,000 or about 10,000. Such double bond is considered here to be one of the functional groups.

The ratio of the magnesium compound to the fluoropolymer is preferably in the range of 1:12 to 5:1, more preferably about 1.1:1. Preferably, the fluoropolymer is a perfluorocarbon polymer, such as a copolymer of, by weight, 95-5% tetrafluoroethylene and 5-95% hexafluoropropylene. (Parts, proportions, and percentages herein are by weight except where indicated otherwise.) The fluoropolymer can be treated to produce the functional groups in various ways, including heating to cause oxidative degradation to less than half of the initial molecular weight. Alternately, it can be subjected 1-100, preferably 10-75, more preferably 20-50, MRads of ionizing radiation such as accelerated electrons in the energy range of 0.2-5 MeV, preferably 2-3 MeV, in an oxygen-containing medium. The magnesium compound can be present during the thermal or radiation degradation, or it can be added later.

The resulting degraded fluoropolymer at least partially reacted with magnesium compound can be blended with asbestos and used to make a superior chlor-alkali cell asbestos diaphragm.

The diaphragms and their preparation and use are also within the invention.

DETAILED DESCRIPTION

While the mechanism of the present invention is not fully understood, and applicant does not wish to be bound by any theory, it is thought that the irradiation of the fluoropolymer causes the formation of carboxyl and carbonyl fluoride groups which can react with and bond to magnesium ions. The magnesium ions are at least partially supplied by the hydration of magnesium oxide and related compounds in aqueous media to form magnesium hydroxide. The reaction of the magnesium ions with the fluoropolymer functional groups forms a stable material from which the magnesium hydroxide is not readily leached at the acid side of the diaphragm. By stabilizing a desirable level of magnesium hydroxide throughout the cross-section of the diaphragm, the hydrophilicity and surface characteristics of the diaphragm become more constant and reliable. Thus, the diaphragm can be used longer before replacement is required. Generally, diaphragms of the invention permit the use of lower voltage and give higher current efficiency than those of the prior art.

Magnesium oxide and hydroxide seem to be unique in the extent of their insolubility in the environment of a chlor-alkali cell diaphragm. In contrast, other alkaline earth metal compounds such as beryllium oxides and hydroxides are much more soluble in caustic solutions; and calcium, strontium and barium oxides and hydroxides are more soluble in water.

A suitable form of magnesium oxide for use in the invention is U.S.P. grade 90, preferably having an average particle size, determined microscopically, about in the range of 0.1-10 μm, with a relatively low bulk density and high surface area.

Chrysotile, preferably from Vermont white serpentine asbestos, is generally used in chlor-alkali cell diaphragms, including those of the invention. Preferably, a mixture of about equal weight quantities of fibers 0.5 and 5 cm long are used. Suitable commercial grades of asbestos are Vermont 3T and 4T and Johns-Manville 4D12 and Chorbestos. However, other forms of asbestos such as blue amphibole may be useful in some circumstances.

Glass fiber is not generally as resistant to the caustic solutions or chlor-alkali cells as is asbestos, but some types of hard or high temperature fiberglass can be used with the invention. Generally, the best types are 0.5-5 cm long fibers of calcium and/or aluminum borosilicate glass compositions. Other inorganic fibrous materials that may be useful with the invention include rock wool, metallic fibers such as beryllium, boron, and tungsten fibers; titania, boron nitride, silicon carbide, alkali titanate fibers; and cloth, paper and woven fabric made of such inorganic fibrous materials. Organic fibrous materials such as PTFE flock may also be used in diaphragms of the invention.

The irradiation of fluoropolymer such as FEP for use in the present invention is preferably done in air or in the presence of magnesium oxide or hydroxide. This seems to improve the oxidation of the FEP and the bonding of the irradiated FEP and the magnesium compound. While absolute dryness is not necessary, large quantities of water make the irradiation less efficient. Suitable irradiation conditions are those described in U.S. Pat. Nos. 3,116,226—Bowers (1963) and 4,029,870 and 4,052,278—both Brown et al. (1977), each of which is incorporated herein by reference.

Irradiation of FEP by $Co^{60}$ gamma ray sources or by various high energy electron beam sources, such as a 2-3 MeV Van de Graaff generator, is satisfactory. Less than about 1 MRad gives insignificant effects, and more than about 100 MRads tends to damage rather than improve the product. As is well known, a Rad is a unit of radiation dosage equivalent to the absorption of 100 ergs per cubic centimeter.

Thermal degradation for use in the invention is preferably done to the extent of reducing the molecular weight of the fluorocarbon polymer at least to one-half of its initial value. It also forms COOH and COF functional groups on the polymer. With FEP, heating at 350° C. in air for 2 hours can suffice. This compares to a heat treatment of at least one hour at 350° C., preferably used to sinter the radiation-degraded FEP-MgO polymer in the form of a diaphragm. Five minutes at 345° C. is insufficient for thermal degradation of FEP according to the invention. Using thermal degradation, better results are obtained with fluorocarbon copolymers which contain Cl, Br, H or double bonds in the chain than with FEP. Also, shorter times such as 40-60 minutes at 350° C. or lower temperatures are satisfactory with such copolymers. As an alternative to heating a dry fluoropolymer powder itself, with or without the magnesium compound, the thermal degradation can be done in situ, in an oxygen-containing medium, after the fluoropolymer, magnesium compound and asbestos or fiberglass have been formed into a chlor-alkali cell diaphragm. Sintering to form a diaphragm requires softening the fluoropolymer polymer adequately so that it sticks together and to the asbestos or fiberglass sufficiently to improve the performance of the diaphragm in a chlor-alkali cell.

Dispersion techniques known in the art can be used to disperse compositions of the invention and asbestos. Preferably 1-6% of a nonionic or anionic surfactant is employed, based on the solids in the dispersion. Vigorous stirring should provide enough energy to make a dispersion which is adequately stable for commercial purposes. A diaphragm is formed by drawing the dispersion through a screen to form a mat about 0.3-1 cm thick. This is an empirical art. The desired thickness of mat can be obtained by controlling the time after the mat can be obtained by controlling the time after the mat has become dense enough that clear-appearing solution instead of cloudy dispersion is being drawn through the mat. It also can be helpful to control the slurry density. After the diaphragm has been formed, it is heated adequately to sinter the fluorocarbon polymer. If FEP is used, 1-2 hours at 350° C. is a desirable heat treatment.

While the exact structures of reacted compositions are not known, it is thought that more or less magnesium enters the fluorocarbon polymer chain, such as in the form:

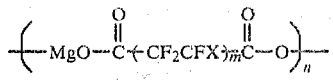

with m and n of varying amounts. X=H, F, Cl, Br, $R_f$ or $R_fO$. R=alkyl groups of 1-5 carbons, and f means the R is perfluorinated. Also, some MgO will probably be pendant to the chain. During drying, exposure to water and air, the electrolysis, the magnesium compounds will convert between magnesium oxide, hydroxide and carbonate. Magnesium oxyhalides and hydroxyhalides, including fluorides, chloride, and combinations thereof, will also undergo partial conversion to and from the other named magnesium compounds. Magnesium oxyfluoride and magnesium fluoride will be formed to some extent if the magnesium compounds are present during radiation or thermal degradation of the fluorocarbon polymer. If magnesium carbonate itself is used to make the diaphragm, $CO_2$ given off upon heating can aid is producing desirable porosity in the diaphragm. Also useful in the invention are Sorel cements of magnesium oxychloride, magnesium hydroxychloride and magnesium hydroxyfluoride.

The melt viscosity of FEP before irradiation is about 40,000 poises. After 20 MRad of 2 MeV electron irradiation, it is about 80-100 poises. This indicates a molecular weight of about 17,400-18,600 for the irradiated polymer. End group titration on the irradiated polymer gives an equivalent weight of 9,340. When both end groups are assumed to be carboxylic acid, this leads to a calculated molecular weight of 18,680.

Infra-red spectroscopy on irradiated FEP shows the presence of —COOH, —COF and —C=C— groups. Even dry and at room temperature, MgO reacts with the —COOH groups to give a —COO—Mg— salt, as shown by infra-red spectroscopy on irradiated FEP/MgO mixtures after removal of MgO with acetic acid.

Upon heating the irradiated FEP/MgO mixture at 350° C. for 1 hour, and then removing the MgO with acetic acid and hydrochloric acid, infra-red spectroscopy shows the presence of ionized —COO— groups and a strong —OH group, but no —COOH, —COF or —C=C—.

The fluoropolymer is preferably a perfluorocarbon such as PTFE or FEP, such as Du Pont's "Teflon" FEP TE 9061 powder with an average particle size of 0.2-5 μm. However, perfluoro alkyl vinyl ethers, vinyl fluoride, vinylidene fluoride, fluorochlorocarbons and fluorobromocarbons and other fluoropolymers can also be used. As is known, a fluorocarbon polymer is composed of fluorine and carbon. A fluoropolymer may have other constituents. A double bond or a hydrogen, chlorine or bromine site is generally a weak site subject to cleavage during radiation or thermal degradation of the polymer.

Preferred compositions of the invention generally contain 25-75% MgO and 75-25% irradiated FEP.

A particularly preferred composition of the invention codispersed with asbestos is, on a solids basis by weight, 21% MgO, 17% irradiated FEP, and 62% asbestos.

In the preferred compositions of the invention, typical atomic percentages and ranges of percentages of the main constituents are given in Table I.

TABLE I

| Element | Atomic % | |
|---|---|---|
| | Range | Typical |
| Mg | 5-50 | 33 |
| O | 5-40 | 22 |
| C | 1-20 | 11 |
| F | 3-50 | 34 |

The following examples illustrate best modes of the invention for various purposes as well as the commercial utility of the invention.

In the examples, copolymers used were made from the indicated monomers in the indicated weight ratio. TFE is tetrafluoroethylene; $VF_2$ in vinylidene fluoride; CTFE is chlorotrifluoroethylene; $TF_3H$ is trifluoroethylene. "Kel F" is a polychlorotrifluoroethylene homopolymer made by 3M Company.

EXAMPLE I

20 MRad FEP and MgO With Asbestos

A—Irradiation and Dispersion

A mixture of 237.8 kg of dry "Teflon" FEP TE 9061 powder blended with 79.2 kg of U.S.P. grade 90 MgO in a "Marion Mixer" was subjected to 20 MRad of 2.5 MeV electron radiation from a Van de Graaff generator at 25° C. in air. The 317 kg irradiated product was then dispersed in 1621 kg of deionized water by blending along with 37.6 kg of Triton X-100 surfactant, 6.8 kg of Defoamer G produced by Henkel Chemical Co., and 65.7 kg of additional U.S.P. grade 90 MgO. The dispersed product is referred to below as the masterbatch. It contains, by weight, about 11.6% irradiated FEP and 7.07% MgO.

B—Diaphragm Preparation

Charge 2800 ml of Wilmington, Delaware, city water, 263 g NaCl, 2 g NaOH and 1 g $NaHCO_3$ and 1 g $Na_2SO_3$ into a 5 liter sparger flask. Mix until all the salts dissolve. Add 20.0 g each of T3 and T4 asbestos fiber. Sparge the mixture for 10 min. with an air speed of about 0.7 $m^3/h$ (25 $ft.^3/h$). Add 6.2 g MgO (U.S.P. 90) and sparge for 20 min. more.

Separately, dilute a dispersion of 103 g masterbatch with 200 ml distilled water in a mixer. Add the polymer dispersion to the sparger flask with sparging. Sparge the asbestos-polymer slurry for an additional ten min. Add several drops of Defoamer G as needed to depress any foam formed.

Pour the asbestos-polymer slurry into a 5-liter stainless steel beaker. Place a cathode screen with an 8.89 cm (3.5 in.) diameter in the beaker and connect to a vacuum set-up. Apply vacuum at 2.5-12.5 cm mercury column for 2-3 min. and then slowly increase to 38 cm. Hold at 38 for about four min. Remove the cathode from the beaker and allow it to dry under 38 cm vacuum for about 10-15 min. Repair any hole with wet asbestos-polymer slurry from the beaker but with no compaction. Smooth out the edge and cut the excess asbestos from the back of the cathode screen.

Place the wet diaphragm in an oven of 95° C. for one hour. At this point the net weight of the diaphragm less the screen is 10.97 g. Bake again at 350° C. for one hour, and the weight drops to 10.2 g.

C—Chlor-Alkali Cell Testing

The diaphragm made in B is placed in a chlor-alkali test cell filled with saturated NaCl brine with pressure from the salt solution column head of 31–40 cm in the anolyte chamber. A PTFE ring with an inside diameter of 7.62 cm is placed between the diaphragm and the anode. The cell is operated with 8.3 A at a current density of 182/dm$^2$ (170 A/ft$^2$) at 95° C. with a brine flow rate through the diaphragm of about 100–110 ml/h to produce chlorine gas.

Such tests for a period of 11 days, producing 2.8–3.1 N NaOH gave a cell voltage initially of 3.024 and at the end of 3.035 and an operating current efficiency of 94.6–96.8%. The concentration of hydrogen in the chlorine gas was 0.067%.

EXAMPLE II

20 MRed Irradiated FEP and MgO With Asbestos

Another diaphragm was made similar to the one of Example I to demonstrate reproducibility of results. A mixture of 434 ml water, 40.7 g NaCl, 0.15 g Na$_2$SO$_3$, 0.15 g NaHCO$_3$, 0.3 g NaOH, and 3.1 g each of T3 and T4 asbestos was made and sparged as in Example IB. To this was added 0.96 g MgO, and sparging continued for another 20 min. Then a mixture of 15.9 g of masterbatch in 30 ml water was added and sparged for 10 min.

The resulting slurry was then put into a beaker and a diaphragm was made as described above. The net weight of the diaphragm after 1 h at 95° C. was 11.2 g and after 1 h at 350° C. was 10.3 g.

The diaphragm was tested as described above but for 28 days with a brine head of 40.6–53.4 cm, and a flow rate of 103.5–115.4 ml/h to make 2.516–1.860 N NaOH. The voltage initially was 3.041 and at the end it was 3.069; the current efficiency was 93.78–97.00; and the concentration of hydrogen in the chlorine gas was 0.087%.

EXAMPLE III

1 MRad FEP and MgO With Asbestos

A—Irradiation and Dispersion

FEP powder was irradiated as in Example I but in a smaller batch and with 1 MRad. 12.0 g of the irradiated powder was codispersed with 7.1 g MgO, 2.0 g Hyonic PE 260 surfactant made by Diamond Shamrock Co. and 200 ml deionized water.

B—Diaphragm Preparation and Testing

A dispersion was made as in the first paragraph of Example IB. This dispersion was blended with that of Example IIIA with sparging, and a diaphragm was made.

A diaphragm was made and tested as in Example I from a sparged blend of the above dispersion with one made as in the first paragraph of Example IB. Two days of tests give initial and final voltages of 3.460 and current efficiencies of 90.1–90.7%. These results were achieved producing caustic having a strength of 2.63–2.83 N with a head of 54.6 cm and a flow rate of 99.3–106 ml/h.

EXAMPLE IV

10 MRad FEP and MgO With Asbestos

Example III was repeated but substituting FEP which had been irradiated with 10 MRad. The net weight of the diaphragm was 9.64 g.

The test was run for 4 days to produce 2.5–2.69 N caustic with a head of 16.5–36.8 cm and a flow rate of 104–114 ml/h. The initial voltage was 3.406, the final voltage was 3.115, and the current efficiency was 90–97%.

EXAMPLE V

50 MRad FEP and MgO With Asbestos

Example III was repeated but with 50 MRad FEP. The net weight of the diaphragm was 10.21 g.

The test was run for 16 days to produce 2.64–2.94 N caustic with a head of 12.7–14 cm and a flow rate of 103–116 ml/h. The initial voltage was 2.978, the final voltage was 2.980, and the current efficiency was 97–99%.

EXAMPLE VI

10 MRad FEP and MgO With Glass Fiber

A dispersion was made by mixing in a 5-liter sparger 51.5 g of masterbatch of Example I with 2880 ml water and 20.0 g of "Pyrex" 3950 glass wool, produced by Corning Glass Works. This is a low-alkali borosilicate glass with a fiber diameter of 0.005–0.007 mm. It was chopped into about 1–2 cm lengths. The dispersion was sparged for 30 min. Then about one-third of the mixture was poured into a 9.0 cm filter funnel to form a 7 mm thick diaphragm mat which was baked one hour at 95° C. and one hour at 350° C. The weight of the mat was 5.3 g.

The diaphragm was tested in a chlor-alkali cell at 182 A/dm$^2$ and 95° C. and gave a voltage of 2.98.

EXAMPLE VII

10 MRad PFA and MgO With Asbestos

Tests were made as in Example I but substituting for the irradiated FEP a smaller batch of simililarly irradiated perfluoro vinyl alkyl ether sold by E. I. du Pont de Nemours and Company as "Teflon" PFA. The resulting cell voltage was 3.180.

EXAMPLE VIII

Thermally-Degraded TFE/VF$_2$ (94/6) and MgO With Asbestos

Charge 2800 ml of distilled water, 263 g NaCl, and 4.0 g MgO into a 5-liter sparger flask. Mix until all salt is dissolved. Add 20.0 g each of T3 and T4 asbestos fiber. Sparge the mixture for 2 h with an air speed of about 0.71 m$^3$/h.

Separately, 48.6 g of TFE/VF$_2$ (94/6) dispersion in methanol with 18.5% solids containing 9.0 g solid TFE/VF$_2$ is diluted with 200 ml distilled water and 5.5 g of an FEP dispersion in water with 55% solids containing 3.0 g FEP is added with stirring. This polymer dispersion is then added to the sparge flask with air sparging. Sparge the asbestos-polymer slurry for an additional ten min. Add several drops of Defoamer G as needed to suppress the foam.

To prepare a wet diaphragm, pour the asbestos-polymer slurry into a 5-liter stainless steel beaker. Place a cathode screen in the beaker and connect to a vacuum set-up. Apply vacuum at 5 cm for 1 min, then 10 cm for 2 min, then 15 cm for 1 min, then 20 cm for 1.5 min. Remove the cathode from the beaker and allow it to dry under 51 cm vacuum for 20 min. Repair any holes with wet asbestos-polymer slurry from the beaker but with no compaction.

The wet diaphragm is baked in an oven at 95° C. overnight, then baked 40 min at 350° C. The weight of diaphragm after baking was 10.2 g. The diaphragm was placed in the cell and run for 4 days at 8.3 A (182 A/dm$^2$) at 95° C, with a head of 56 cm to produce 1.80 N caustic at a flow rate of 136 ml/h. The initial voltage was 3.112, the final voltage was 3.119, and the current efficiency was 90.0%.

EXAMPLE IX

Thermally Degraded TFE/VF$_2$ (93/7) and MgO With Asbestos

Charge 2800 ml of distilled water and 263 g NaCl into a 5-liter sparge flask. Mix until all salt is dissolved. Add 20.0 g each of T3 and T4 asbestos fiber and 8.0 g MgO. Sparge the mixture for 2 h with an air speed of about 0.71 m$^3$/h.

Separately, 61.7 g of TFE/VF$_2$ (93/7) dispersion in methanol with 14.6% solids containing 9.0 g solid TFE/VF$_2$ was diluted with 200 g saturated NaCl solution plus 2 g Triton X-100 surfactant and 5.5 g of an FEP dispersion in water with 55% solids containing 3.0 g FEP is added with stirring. This polymer dispersion is then added to the sparger flask with air sparging. Sparge the asbestos-polymer slurry for an additional ten min. Add several drops of Defoamer G as needed to suppress the foam.

Prepare a wet diaphragm as in Example VIII and bake it at 95° C. for 4 h, then at 350° C. for 40 min. The weight of diaphragm after baking was 8.1 g. The diaphragm was placed in the cell and run for 4 days at 8.3 A (182 A/dm$^2$) at 95° C. with a head of 0 cm to produce 2.89 N caustic at a flow rate of 118 ml/h. The initial voltage was 2.952, the final voltage was 3.142, and the current efficiency was 96.0%.

EXAMPLE X

Thermally-Degraded TFE/CTFE/VF$_2$ (80/16/4) and MgO With Asbestos

Charge 2800 ml of distilled water and 263 g NaCl into a 5-liter sparger flask. Mix until all salt is dissolved. Add 20.0 g each of T3 and T4 asbestos fiber and 4.0 g of MgO. Sparge the mixture for 2 h with an air speed of about 0.71 m$^3$/h.

Separately 56.3 g of TFE/CTFE/VF$_2$ (80/16/4) dispersion in methanol with 16% solids containing 9.0 g polymer was diluted with 200 g water plus 1 g Triton X-100 surfactant and 3.0 g Kel-F 81 powder (3M Company) is added with stirring. This polymer dispersion is then added to the sparge flask with air sparging. Sparge the asbestos-polymer slurry for an additional ten min. Add several drops of Defoamer G as needed to suppress the foam.

Prepare a wet diaphragm as in Example VIII and bake it at 95° C. for 4 h, then at 290° C. for 40 min. The weight of the diaphragm after baking was 10.4 g. The diaphragm was placed in the cell and run for 6 days at 8.3 A (182 A/dm$^2$) at 95° C. with a head of 5 cm to produce 2.63 N caustic at a flow rate of 112 ml/h. The initial voltage was 3.122, the final voltage was 3.184, and the current efficiency was 96.0%.

EXAMPLE XI

Thermally-Degraded CTFE/TF$_3$H (96/4) and MgO With Asbestos

Charge 2800 ml of distilled water and 263 g NaCl into a 5-liter sparge flask. Mix until all salt is dissolved. Add 20 g each of T3 and T4 asbestos fiber and 8.0 g MgO. Sparge the mixture for 2 h with an air speed of about 0.71 m$^3$/h.

Separately, 60.2 of CTFE/TF$_3$H (96/4) dispersion in methanol with 14.94% solids containing 9.0 g polymer was diluted with 100 cc methanol plus 2 g Triton X-100 surfactant. 5.5 g of an FEP dispersion in water with 55% solids containing 3.0 g FEP is added with stirring. Then 200 cc saturated NaCl solution plus 2 g Triton X-100 is added with stirring. This polymer dispersion is then added to the sparge flask with air sparging. Sparge the asbestos-polymer slurry an additional 15 min. Add several drops of Defoamer G as needed to suppress foam.

Prepare a wet diaphragm as in Example VIII and bake it at 95° C. for 4 h, then at 350° C. for 1 h. The weight of baked diaphragm was 10.8 g. Diaphragm was placed in the cell and run for 3 days at 8.3 A (182 A/dm$^2$) at 95° C. with a head of 17.8 cm to produce 2.404 N caustic at a flow rate of 111 ml/h. The initial voltage was 3.510, the final voltage was 3.352, and the current efficiency was 97.0%.

EXAMPLE XII

Thermally-Degraded TFE/VF$_2$ and MgCO$_3$ With Asbestos

Charge 2800 ml of city water, 263 g NaCl, 2 g NaOH, 1 g NaHCO$_3$, and 1 g Na$_2$SO$_3$ into a 5-liter sparger flask. Mix until all salts dissolved. Add 20.0 g each of T3 and T4 asbestos fiber. Sparge the mixture for ten min. The air speed is about 0.70 m$^3$/h.

Separately prepare a dispersion of 12.0 g TFE/VF$_2$ (100/3) copolymer, 1.8 g MgCO$_3$ (Fisher Scientific Co., Catalog No. M-29), 5.4 g MgO (U.S.P. 90), 1.0 g Triton X-100, and 200 ml water in a mixer. Add the polymer dispersion to the sparger flask with air sparging. Sparge the asbestos-polymer slurry for an additional ten min. Add several drops of Defoamer G as needed to suppress foam.

Pour the asbestos-polymer slurry into a 5-liter stainless steel beaker. Place the cathode screen in the beaker and connect to a vacuum set-up. Apply vacuum at 2.5–12.5 cm for 2–3 min and then slowly increase to 38 cm. Hold at 38 cm for about 5 min. Remove the cathode from the beaker and allow it to dry under 38 cm vacuum for about 10–15 min. Repair any hole with wet asbestos-polymer slurry from the beaker but with no compaction. Smooth out the edge. Care should be taken not to allow excess asbestos to form at the back of the cathode screen.

Place the wet diaphragm in an oven and bake it first at 95° C. for 1 h and then at 350° C. for 2 h. The weight of the diaphragm after baking was 9.51 g. The diaphragm was placed in the cell and run for 22 days at 8.3 A (182 A/dm$^2$) at 95° C. with a head of 43–50 cm to produce 2.56–2.73 N caustic at a flow rate of 103–117 ml/h. The initial voltage was 2.983, the final voltage was 2.971, and the current efficiency was 90.8–95.3%.

COMPARATIVE TEST I

Asbestos

Prepare a slurry of 3000 ml water, 290 g NaCl, 290 g aOH, and 40.0 g 4D12 asbestos produced by Johns [M]anville Co., and sparge 1 h.

Prepare a wet diaphragm as in Example VIII an[d al]low it to dry overnight in air at 25° C. without baking. [T]he weight of diaphragm was 12.4 g. The diaphragm [w]as placed in the cell and run for 7 days at 8.3 A (182 [A]/dm$^2$) at 95° C. with a head of 24–55 cm to produce 1–2.26 N caustic at a flow rate of 125–146 ml/h. The [in]itial voltage was 3.68, the final voltage was 3.38, and [th]e current efficiency was 94–98%.

COMPARATIVE TEST II

FEP With Asbestos

Prepare a slurry of 2800 ml water, 263 g NaCl, 1.0 g [N]a$_2$SO$_3$, 1.0 g Na$_2$CO$_3$, 2.0 g NaOH, 10.0 g T3 asbestos [an]d 10.0 g T4 asbestos and sparge 30 min.

Add to that slurry 21.8 g of an aqueous dispersion of [" ]Teflon" T-120 FEP with 55% solids containing 12.0 g FEP and sparge for 10 min.

Prepare a wet diaphragm as in Example VIII and [b]ake it for 1 h at 95° C., then 7 min at 300° C. The [w]eight of diaphragm after baking was 11.59 g. The [di]aphragm was placed in the cell and run at 8.3 A (182 [A]/dm$^2$) at 95° C. with a head of 32 cm to produce 2.55 [N] caustic at a flow rate of 102 ml/h. The voltage was [3.]322, and the current efficiency was 84%.

COMPARATIVE TEST III

FEP and MgO With Asbestos-Not Degraded

Place in a Waring blender 6.25 MgO (U.S.P. 90), 25.0 "Chlorobestos" asbestos produced by Johns Manville [C]ompany for chlor-alkali use, 114 g of a 55% solids ["]Teflon" FEP dispersion, and 1500 ml water and blend [fo]r 1 min.

Prepare a separate dispersion of 15.0 g "Teflon" TFE fluorocarbon with 6–7 cm fiber length, 1.0 g [T]riton X-100, and 100 ml water. Add the dispersion to [th]e blender and mix.

A wet diaphragm was made as in Example VIII and [b]aked 5 min at 120° C. and then 5 min at 345° C. The [w]eight of diaphragm after baking was 13 g. The dia[p]hragm was placed in the cell and run at 8.3 A (182 [A]/dm$^2$) at 95° C. for one day to produce 2.4 N caustic [a]t a flow rate of 119 ml/h. The voltage was 4.2–3.616 [a]nd the current efficiency was 88–93%.

I claim:

1. A composition of matter comprising at least one [m]agnesium compound and a fluoropolymer,
   said magnesium compound being at least partially reacted with said fluoropolymer, said magnesium compound being selected from magnesium oxide, hydroxide, carbonate, oxyhalide and hydroxyhalide, wherein the halide is at least one of fluorine and chlorine, and
   said fluoropolymer containing functional groups of carboxyl ions, carboxylic acid or carbonyl fluoride or combinations thereof and optionally olefinic double bonds, and having an equivalent weight for each such functional group of not more than about 25,000.

2. The composition of claim 1 in which the fluoropolymer contains functional groups of both carboxylic acid and carbonyl fluoride.

3. The composition of claim 1 in which the fluoropolymer contains functional groups of carboxyl ions.

4. The composition of claim 1 in which the equivalent weight is not more than about 10,000.

5. The composition of claim 1 in which the weight ratio of said magnesium compound to said fluoropolymer is in the range of 1:12 to 5:1.

6. The composition of claim 5 in which the weight ratio of said magnesium compound to said fluoropolymer is about 1.1:1.

7. The composition of claim 1 in which the fluoropolymer is a perfluorocarbon polymer containing said functional groups.

8. The composition of claim 2 in which the fluoropolymer is a copolymer, by weight, of 95–5% tetrafluoroethylene and 5–95% hexafluoropropylene.

9. The composition of claim 8 in which the copolymer contains, by weight, 95–97% tetrafluoroethylene and 25–5% hexafluoropropylene.

10. The composition of claim 9 in which the copolymer contains, by weight, about 85% tetrafluoroethylene and 15% hexafluoropropylene.

11. The composition of claim 1 in which the molecular weight of the fluoropolymer is in the range of about 1000–100,000.

12. The composition of claim 11 in which the molecular weight of the fluoropolymer is in the range of about 2000–50,000.

13. The composition of claim 12 in which the molecular weight of the fluoropolymer is in the range of about 9000–20,000.

14. The composition of claim 1 in which the fluoropolymer is a perfluorocarbon polymer containing said functional groups and is a copolymer containing, by weight, about 85% tetrafluoroethylene and 15% hexafluoropropylene, said copolymer has a molecular weight in the range of about 9000–20,000, and the weight ratio of said magnesium compound to said fluoropolymer is about 1.1:1.

15. A method for producing the composition of claim 1 wherein a fluoropolymer is subjected to about 1–100 MRads of ionizing radiation in an oxygen-containing medium to produce said functional groups, and said fluoropolymer is mixed with said magnesium compound and permitted to react.

16. The method of claim 15 wherein the fluoropolymer is subjected to about 10–75 MRads of ionizing radiation.

17. The method of claim 16 wherein the fluoropolymer is subjected to about 20–50 MRads of ionizing radiation.

18. The method of claim 15 wherein the ionizing radiation is in the form of accelerated electrons having an energy level in the range of about 0.2–5 MeV.

19. The method of claim 18 wherein the ionizing radiation is in the form of accelerated electrons having an energy level in the range of about 2 MeV.

20. The method of claim 15 wherein at least 2% by weight of the magnesium compound, based on the fluoropolymer, is present during the irradiation.

21. The method of claim 15 wherein the magnesium compound is mixed with the fluoropolymer after said irradiation.

22. The method of claim 15 wherein the irradiation is conducted in air.

23. A method for producing the composition of claim 14 wherein a fluoropolymer is subjected to about 1–1000 MRads of ionizing radiation in an oxygen-containing medium to produce said functional groups, and said fluoropolymer is mixed with said magnesium compound and permitted to react.

24. A method for producing the composition of claim 1 wherein a fluoropolymer is heated in an oxygen-containing medium to produce said functional groups and said fluoropolymer is mixed with said magnesium compound and permitted to react, the heating being adequate to thermally degrade said fluoropolymer to less than half of its initial molecular weight.

25. An aqueous dispersion of the composition of claim 1 which also contains surfactant in an amount effective to disperse the composition.

26. The aqueous dispersion of claim 25 having a solids content of up to about 30% by weight.

27. The aqueous dispersion of claim 26 having a solids content of about 20% by weight.

28. An aqueous dispersion of the composition of claim 15 which also contains surfactant in an amount effective to disperse the composition.

29. The aqueous dispersion of claim 28 having a solids content of up to about 30% by weight.

30. The aqueous dispersion of claim 29 having a solids content of about 20% by weight.

31. A composition suitable for producing an improved diaphragm for a chlor-alkali cell comprising a composition of claim 25 mixed with an aqueous dispersion of at least one type of fiber selected from asbestos and borosilicate fiberglass, said fiber being present in an amount of about 50–95% by weight based on the fluoropolymer plus the magnesium compound.

32. The composition of claim 31 in which the asbestos is present in an amount of about 55–65% by weight based on the fluoropolymer plus the magnesium compound.

33. The composition of claim 31 in which the asbestos is present in an amount of about 60% by weight based on the fluoropolymer plus the magnesium compound.

34. The composition of claim 31 in which the selected fiber is asbestos.

35. The composition of claim 34 in which the selected fiber is chrysotile asbestos.

36. A modified asbestos diaphragm for a chlor-alkali cell comprising the composition of claim 31 in which the selected fiber is asbestos, which composition has been deposited on a substrate and sintered.

37. A modified asbestos diaphragm for a chlor-alkali cell comprising asbestos and a composition made by the method of claim 15.

38. A modified asbestos diaphragm for a chlor-alkali cell comprising asbestos and a composition made by the method of claim 24.

39. A process of making a diaphragm of claim 36 by depositing said composition on a substrate and sintering said composition.

40. An electrolytic process for producing chlorine by passing electric current through a chlor-alkali cell having a diaphragm of claim 34.

41. The composition of claim 1 which includes magnesium oxide.

42. The composition of claim 1 which includes magnesium hydroxide.

43. The composition of claim 1 which includes magnesium carbonate.

44. The composition of claim 1 which includes magnesium oxychloride.

45. The composition of claim 1 which includes magnesium hydroxychloride.

* * * * *